US011286914B2

(12) United States Patent
Christiansen et al.

(10) Patent No.: US 11,286,914 B2
(45) Date of Patent: Mar. 29, 2022

(54) NACELLE BASE FRAME ASSEMBLY FOR A WIND TURBINE

(71) Applicant: Vestas Wind Systems A/S, Aarhus N. (DK)

(72) Inventors: Thomas Møller Christiansen, Hjortshøj (DK); Erik Markussen, Videbæk (DK); Ivan Bech Lauridsen, Ringkøbing (DK); Jan Kjærsgaard Petersen, Randers Nø (DK); Anders Haslund Liingaard, Hinnerup (DK)

(73) Assignee: Vestas Wind Systems A/S, Aarhus N. (DK)

( * ) Notice: Subject to any disclaimer, the term of this patent is extended or adjusted under 35 U.S.C. 154(b) by 219 days.

(21) Appl. No.: 16/099,878

(22) PCT Filed: May 16, 2017

(86) PCT No.: PCT/DK2017/050152
§ 371 (c)(1),
(2) Date: Nov. 8, 2018

(87) PCT Pub. No.: WO2018/001424
PCT Pub. Date: Jan. 4, 2018

(65) Prior Publication Data
US 2019/0136837 A1    May 9, 2019

(30) Foreign Application Priority Data

Jun. 30, 2016 (DK) .......................... PA 2016 70470

(51) Int. Cl.
*F03D 80/70* (2016.01)
*F03D 13/10* (2016.01)
(Continued)

(52) U.S. Cl.
CPC ............. *F03D 80/70* (2016.05); *F03D 13/10* (2016.05); *F03D 13/20* (2016.05); *F03D 80/88* (2016.05);
(Continued)

(58) Field of Classification Search
CPC .......... F03D 13/10; F03D 13/20; F03D 80/70; F03D 80/80; F03D 80/88; F05D 2240/14;
(Continued)

(56) References Cited

U.S. PATENT DOCUMENTS 7,458,776 B2 * 12/2008 LLorente Gonzalez ..................... F03D 7/0244
416/9
2011/0061332 A1 * 3/2011 Hettick ................. B29C 66/723
52/651.07
(Continued)

FOREIGN PATENT DOCUMENTS

CN    102639884 A    8/2012
CN    202946314 U    5/2013
(Continued)

OTHER PUBLICATIONS

Danish Patent and Trademark Office, Search and Examination Report in PA 2016 70470, dated Jan. 18, 2017.
European Patent Office, International Search Report and Written Opinion in PCT Application No. PCT/DK2017/050152_072117.
China National Intellectual Property Administration, First Notification of Office Action in CN Application No. 201780038566.5, dated Oct. 9, 2019.

*Primary Examiner* — Eldon T Brockman
*Assistant Examiner* — Danielle M. Christensen
(74) *Attorney, Agent, or Firm* — Wood Herron & Evans LLP (57) ABSTRACT

A base frame assembly (24) for supporting a main shaft housing of a wind turbine comprises a base frame (50) having a plurality of mounting pads (42) for receiving the main shaft housing (20) thereon; and a brace component (52) comprising a plurality of arm portions (54), each arm
(Continued)

portion (54) terminating in a respective support plate (56). Each one of the mounting pads (42) of the base frame (50) is configured to interface with and be secured to a corresponding one of the support plates (56) of the brace component (52).

20 Claims, 4 Drawing Sheets

(51) Int. Cl.
*F03D 13/20* (2016.01)
*F03D 80/80* (2016.01)

(52) U.S. Cl.
CPC ....... *F05B 2240/14* (2013.01); *F05B 2240/50* (2013.01); *F05B 2260/30* (2013.01); *Y02E 10/72* (2013.01); *Y02E 10/728* (2013.01)

(58) Field of Classification Search
CPC ............. F05D 2240/50; F05D 2240/90; F05D 2260/30; F05D 2240/60; F16C 2360/31; F16C 35/047; F16C 19/548; Y02E 10/726
See application file for complete search history.

(56) References Cited

U.S. PATENT DOCUMENTS

| | | | |
|---|---|---|---|
| 2012/0224799 A1 | 9/2012 | Wagner | |
| 2014/0010664 A1* | 1/2014 | Markussen | ........... F16C 35/047 |
| | | | 416/244 R |
| 2014/0300112 A1* | 10/2014 | Lee | ......... B66C 1/108 |
| | | | 290/55 |

FOREIGN PATENT DOCUMENTS

| | | |
|---|---|---|
| CN | 103518062 A | 1/2014 |
| CN | 203560047 U | 4/2014 |
| CN | 204553121 U | 8/2015 |
| CN | 106224178 A | 12/2016 |
| EP | 2693048 A2 | 2/2014 |
| EP | 2699799 B1 | 1/2015 |
| KR | 20120071045 A | 7/2012 |
| WO | 2011051369 A2 | 5/2011 |
| WO | 2012052022 A1 | 4/2012 |
| WO | 2012119603 A2 | 9/2012 |

\* cited by examiner

NACELLE BASE FRAME ASSEMBLY FOR A WIND TURBINE

TECHNICAL FIELD

Aspects of the present invention relate to support structures for wind turbines, and more particularly but not exclusively, to a nacelle base frame assembly for a wind turbine.

BACKGROUND

In order to fulfil the growing need for clean, renewable energy production, horizontal axis wind turbines (HAWTs) are being designed with increasingly longer rotor blades, up to and even sometimes exceeding 80 m in length. In order to support such large rotor blades, all of the other components of the wind turbine (such as the nacelle and the tower) must also correspondingly increase in size and weight.

Increasing the size of the wind turbine rotor blades leads to a corresponding increase in the loading to which they are subjected during normal use, as the gravitational, gyroscopic, centrifugal and torsional forces acting on the rotor blades will increase as their size increases. The blade loads influence other components of the wind turbine to which the rotor blades are attached, for example, the nacelle and its constituent components, as well as the tower itself, and so these components must consequently be designed to withstand these increased forces.

Base frames (also sometimes known as bedplates or main frames), most commonly produced as cast steel structures, are provided to support the nacelle and to transfer the rotor forces to the turbine tower itself. The base frames also commonly act as an interface between the nacelle and the yaw bearing system, providing support as the rotor blades are moved into and out of the wind. As the base frames must be able to handle the loading and strain associated with supporting and moving the nacelle and rotor blades, the base frames must have a high strength and stiffness, and can consequently be extremely heavy, up to and even sometimes exceeding 50 tonnes in some cases.

Such large and heavy base frames present various challenges during production, as accurate casting and machining of such a large piece of equipment is difficult. Furthermore, after production, transportation of the finished base frames from the production site to the installation site can also be difficult, costly and time-consuming due to their size and weight.

It is against this background that the embodiments of the invention have been devised.

SUMMARY OF THE INVENTION

According to an embodiment of the present invention, there is provided a base frame assembly for supporting a main shaft housing of a wind turbine. The base frame assembly comprises a base frame having a plurality of mounting pads for receiving the main shaft housing thereon. The base frame assembly also comprises a brace component, comprising a plurality of arm portions, each arm portion terminating in a respective support plate. Each one of the mounting pads of the base frame is configured to interface with and be secured to a corresponding one of the support plates of the brace component.

The above configuration is advantageous as the base frame assembly is separable into its component parts, making the base frame assembly as whole easier to produce and transport. The brace component also provides a stiffening and strengthening function to the base frame, enabling it to support the heavy weight and forces exerted by the main shaft housing.

Optionally, when the main shaft housing is received onto the base frame, each support plate of the brace component is sandwiched between and secured to a respective support foot of the main shaft housing and the respective mounting pad of the base frame.

In the above configuration, the brace component effectively acts as a spacer between the base frame and main shaft housing, and the footprint of the brace component matches the footprints of the base frame and the main shaft housing. This allows the retrofitting of the brace components into an existing nacelle design to be very simple and require little modification of existing components and designs.

Optionally, each support plate and respective mounting pad are secured using a common group of one or more fasteners.

The above configuration ensures that the only requirement during installation is the use of long bolts that are designed to extend through a support foot of the main shaft housing, pass through a respective support plate of the brace component and extend into a respective mounting pad of the base frame. This thereby simplifies the manufacture and installation of the base frame assembly.

Optionally, the base frame is generally annular in horizontal cross-section and provides a substantially open central portion.

The majority of the loading of the main shaft housing is designed to act through the outer portions of the base frame for increased stability. This configuration is also advantageous as it ensures that no specific configuration or positioning restrictions are imposed on the means by which the base frame assembly is secured to the wind turbine tower. In addition, any components that may need to pass from the nacelle into the wind turbine tower may easily pass through the open centre of the base frame.

Optionally, the brace component is generally X-shaped.

The brace component will therefore comprise four arm portions that radiate from a central point or hub, each arm portion terminating in a respective support plate sized and configured to be attached to one of the corresponding mounting pads. This advantageously ensures that the form factor of the brace component matches that of the base frame, and that the loads transferred from the main shaft housing to the tower via the base frame are evenly distributed across the base frame, so as to minimise local deformations to the base frame.

Optionally, the base frame comprises a plurality of separable sub-components. In particular, the base frame may comprise first and second half-portions.

The above configuration thereby provides a base frame assembly of increased portability compared to a single-unit base frame assembly, as each individual sub-component is smaller and lighter and therefore easier to produce and transport, than a base frame assembly produced as a single unit.

The underside of the base frame may carry a plurality of yaw bar components, and one of the yaw bar components may span a joint between two of the base frame sub-components. For example, between one of the yaw bar components may span a joint between the first and second base frame half portions.

This provides the dual function of coupling or interfacing the base frame assembly to the yaw system, allowing the nacelle and rotor blades to be moved in and out of the wind direction; as well as strengthening the joints between the base frame sub-components and decreasing the chances of local deformations.

Optionally, a strengthening bar is provided across an upper surface of a joint between the two base frame sub-components.

These strengthening bars advantageously bridge the joints between each of the base frame sub-components, strengthening the joints and preventing them from breaking, cracking, or otherwise separating from one another due to the strain that accompanies prolonged usage of the base frame assembly.

Optionally, the brace component has a greater dimension in the vertical plane than in a horizontal plane. For example, the brace component may be substantially flat and horizontal (with a relatively small thickness), or it may be substantially flat and vertical (with a relatively large thickness). In some cases, the brace component may be comprise a solid rod, while in other cases, the brace component (when viewed from the side), may be shaped like an I-beam. In some examples, the brace component may have a generally tubular cross-section.

Advantageously, the above designs and configurations of the brace component may be selected in particular instances to achieve certain strength characteristics, depending on the buckling strength that is required.

According to another embodiment of the present invention, there is provided a base frame assembly for supporting a main shaft housing of a wind turbine, the base frame assembly comprising a base frame having a plurality of mounting pads for receiving the main shaft housing. The base frame comprises at least first and second frame portions.

Advantageously, a multiple portion base frame is more portable and easier to produce than a single-piece base frame, as each individual portion of the base frame is smaller and lighter, and therefore easier to manufacture and transport.

Optionally, an underside of the base frame carries a plurality of yaw bar components, wherein one of the yaw bar components spans a joint between the two base frame half portions. Alternatively or additionally, a strengthening bar may be provided across an upper surface of a joint between the first and second base frame half portions.

The base frame assembly may further comprise a brace component, wherein the brace component comprises a plurality of arm portions, each arm portion terminating in a respective support plate. Each of the mounting pads of the base frame may be configured to interface with and be secured to (either directly or indirectly) a corresponding one of the support plates of the brace component.

Such a brace component provides an additional connection between the individual portions of the base frame and therefore strengthens and supports the joints between the base frame portions. The brace component also strengthens the base frame assembly as a whole, ensuring that the loads transferred from the main shaft housing to the wind turbine tower are evenly distributed across the base frame.

According to another embodiment of the present invention, there is provided a nacelle of a wind turbine incorporating a base frame assembly substantially as described above.

BRIEF DESCRIPTION OF THE DRAWINGS

One or more embodiments of the invention will now be described, by way of example only, with reference to the accompanying drawings, in which.

DETAILED DESCRIPTION

A specific embodiment of the invention will now be described in which numerous specific features will be discussed in detail in order to provide a thorough understanding of the inventive concept as defined in the claims. However, it will be apparent to the skilled person that the invention may be put in to effect without the specific details and that in some instances, well known methods, techniques and structures have not been described in detail in order not to obscure the invention unnecessarily.

Figure 1:
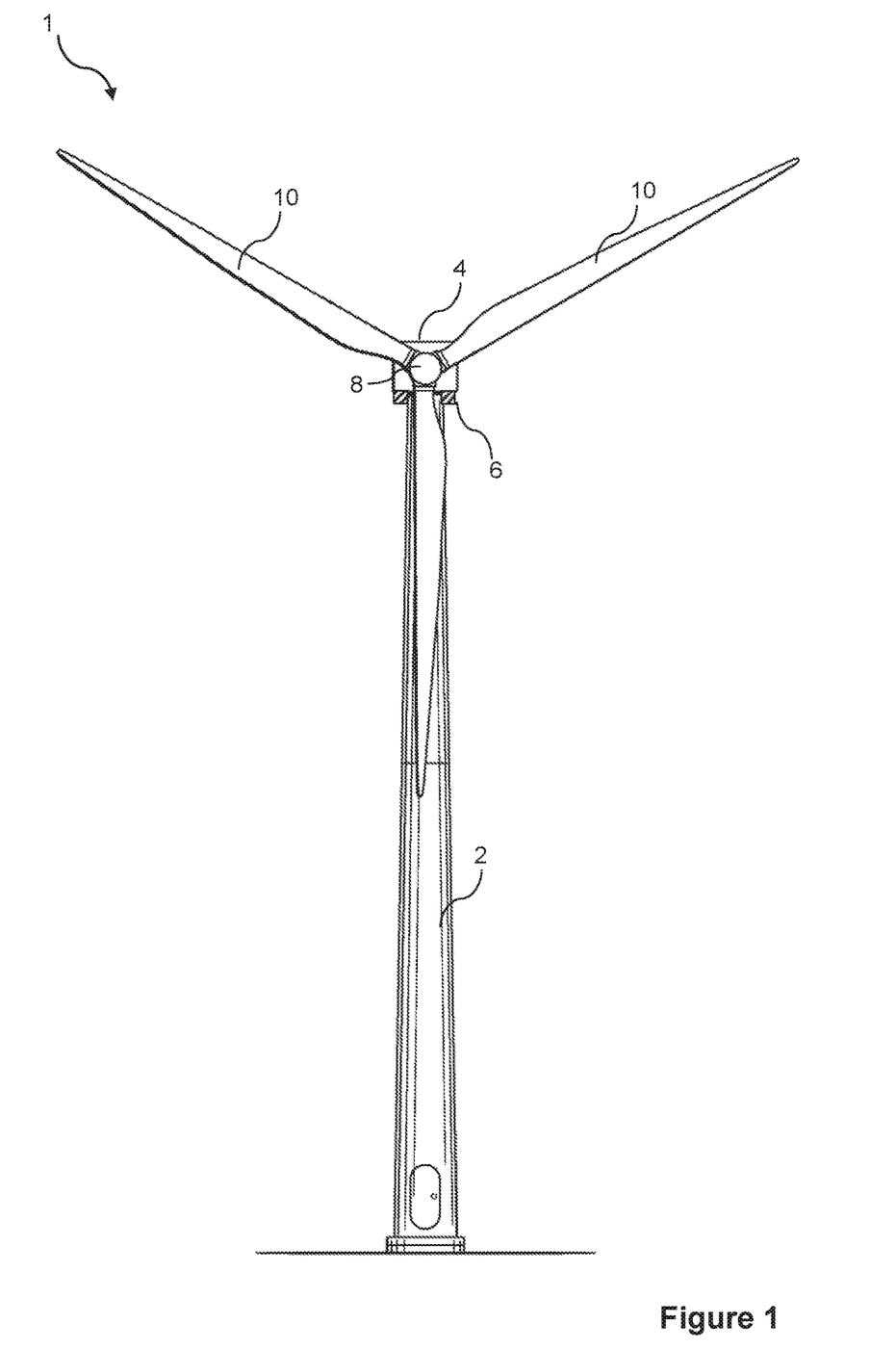
FIG. 1 shows a schematic diagram of a wind turbine in which a base frame assembly according to an embodiment of the present invention may be implemented.

In order to place the embodiments of the invention in a suitable context, reference will firstly be made to FIG. 1, which illustrates schematically a typical HAWT in which a base frame assembly according to an embodiment of the present invention may be implemented. Although this particular image depicts an on-shore wind turbine, it will be understood that equivalent features will also be found on off-shore wind turbines.

The wind turbine 1 comprises a tower 2, a nacelle 4 rotatably coupled to the top of the tower 2 by a yaw system 6, a rotating hub 8 mounted to the nacelle 4 and a plurality of wind turbine rotor blades 10 coupled to the hub 8. The nacelle 4 and rotor blades 10 are turned and directed into the wind direction by the yaw system 6. The nacelle 4 houses all of the generating components of the wind turbine, including the generator, gearbox, drive train and brake assembly, as well as convertor equipment for converting the mechanical energy of the wind into electrical energy for provision to the grid. The nacelle 4 also necessarily contains a main shaft housing (not shown in FIG. 1), which houses a main rotor shaft that is connected at a forward end to the hub 8 and rotor blades 10, and at a rear end to the generating components.

Figure 2:
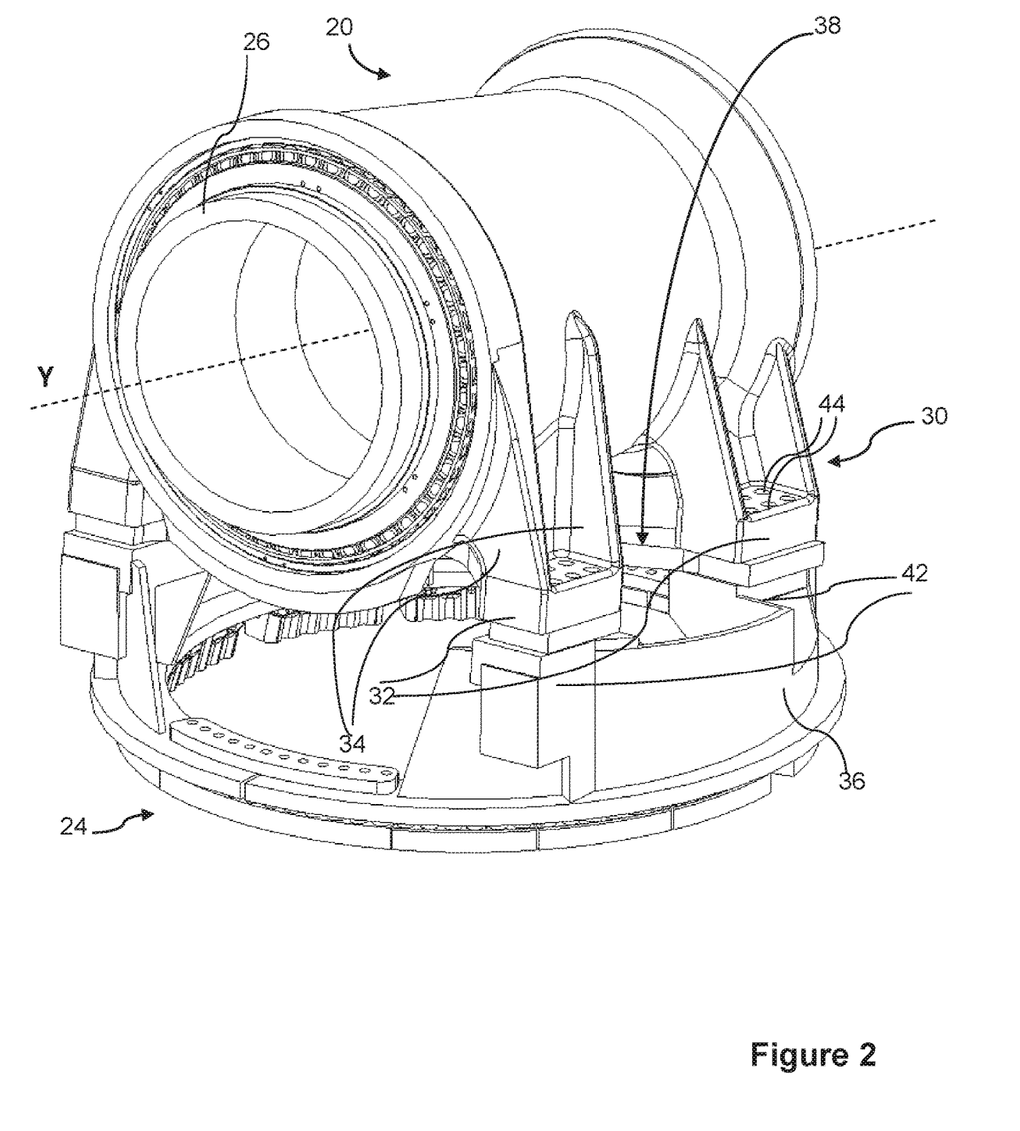
FIG. 2 is a schematic illustration of a portion of the wind turbine of FIG. 1 comprising the main shaft housing and a supporting base frame assembly, according to an embodiment of the present invention.

The schematic illustration of FIG. 2 shows a close-up schematic view of the main shaft housing 20 of a typical wind turbine 1, in which the main shaft housing 20 is attached to a load-bearing base frame assembly 24, according to an embodiment of the present invention. The base frame assembly 24 provides support to the main shaft housing 20, transmitting the forces from the hub 8 and rotor blades 10 to the wind turbine tower 2. The base frame assembly 24 may also provide support for the nacelle 4. It should be appreciated that, for convenience, the main shaft housing 20 is shown in isolation here without any of the other generating equipment attached to it.

The main shaft housing 20 comprises a rotor shaft 26 which is attached to the hub 8, for example by bolts, though it should be noted that the means for coupling the rotor shaft to the hub is not shown here for clarity. The main shaft housing 20 also comprises a front bearing and a rear bearing (both not shown) which are suitable bearings, such as roller bearings, that enable the rotor shaft 26 to rotate about a horizontal 'rotor axis' Y.

The main shaft housing 20 of FIG. 2 also comprises a plurality of supporting legs 30. In the illustrated embodiments, these are arranged in two pairs—a first pair of supporting legs is provided adjacent to (and just behind) the front bearing, and a second pair of supporting legs is provided adjacent to (and just ahead of) the rear bearing. As used herein, the term 'ahead' refers to a direction along the Y axis that lies proximal to the hub and rotor blades; similarly the term 'behind' refers to a direction along the Y axis that lies distal from the hub. The main shaft housing 20 is mounted on a plurality of rectangular support feet 32, each of which is provided at the end of one of the supporting legs 30. Each supporting leg 30 comprises two flanges or webs 34 that extend generally vertically upwards from the respective support foot 32 and merge into an outer surface of the main support housing 30. It will be appreciated that the configuration of the supporting legs (and in particular the shape and configuration of the flanges or webs 34) may be varied depending on design preference. Such embodiments would constitute minor design variations and are also deemed to fall within the scope of the present invention.

The base frame assembly 24 of FIG. 2 comprises a base frame main support portion 36 that is generally annular in horizontal cross-section, and a brace component 38 positioned between the main shaft housing 20 and the base frame main support portion 36.

The main support portion 36 supports the main shaft housing 20 and the brace component 38 on its upper surface and interfaces with the top of the wind turbine tower at its lower surface. It should be understood that throughout this specification, when the terms 'interface', 'secure' or 'couple' are utilised with regard to two components, they should be taken to mean either direct or indirect interfacing between the components. For example, the components may be secured directly to one another, or may be secured to one another via a third component, such as a gasket provided between two components to allow for vibration isolation. In particular, the main support portion 36 comprises a mounting (not shown) on its underside for interfacing with the yaw system 6 provided in the tower. Although not shown in this figure, the underside of the main support portion 36 may carry and be attached to a plurality of 'yaw bars' (also sometimes referred to as 'yaw claws' or 'claw bars') that provide an interface to the yaw system 6.

A plurality of mounting pads 42 are provided on an upper surface of the main base frame support portion 36 at corresponding locations so as to interface with the support feet 32 of the main shaft housing 20, with each mounting pad 42 being laterally separated from the other mounting pads. In the illustrated embodiment, the interface between the mounting pads 42 of the base frame and the support feet 32 of the main shaft housing 20 is indirect and via the brace component 38. Expressed in another way, the mounting pads 42 have the same geometry, form factor or effective footprint as the support feet 32 of the main shaft housing 20. In the illustrated embodiment, this is a substantially rectangular footprint when viewed from above. This design results in an even distribution of the weight of the main shaft housing 20 to the attached base frame assembly 24, preventing stress concentrations from developing in any portion of the base frame assembly.

The main shaft housing 20 is configured to be fastened or otherwise secured to the base frame assembly via the interfaces between the mounting pads 42 (and the brace component 38), and the respective support feet 32. In the example of FIG. 2, the mounting pads 42 and the support feet 32 are each provided with a group of holes or openings 44 into and/or through which bolts or other fastenings can be inserted to secure the two complementary components together. It will be appreciated that the number, configuration and location of the holes or openings provided may be varied depending on design preference and that such variations and alternative embodiments are deemed to fall within the scope of the present invention.

Figure 3:
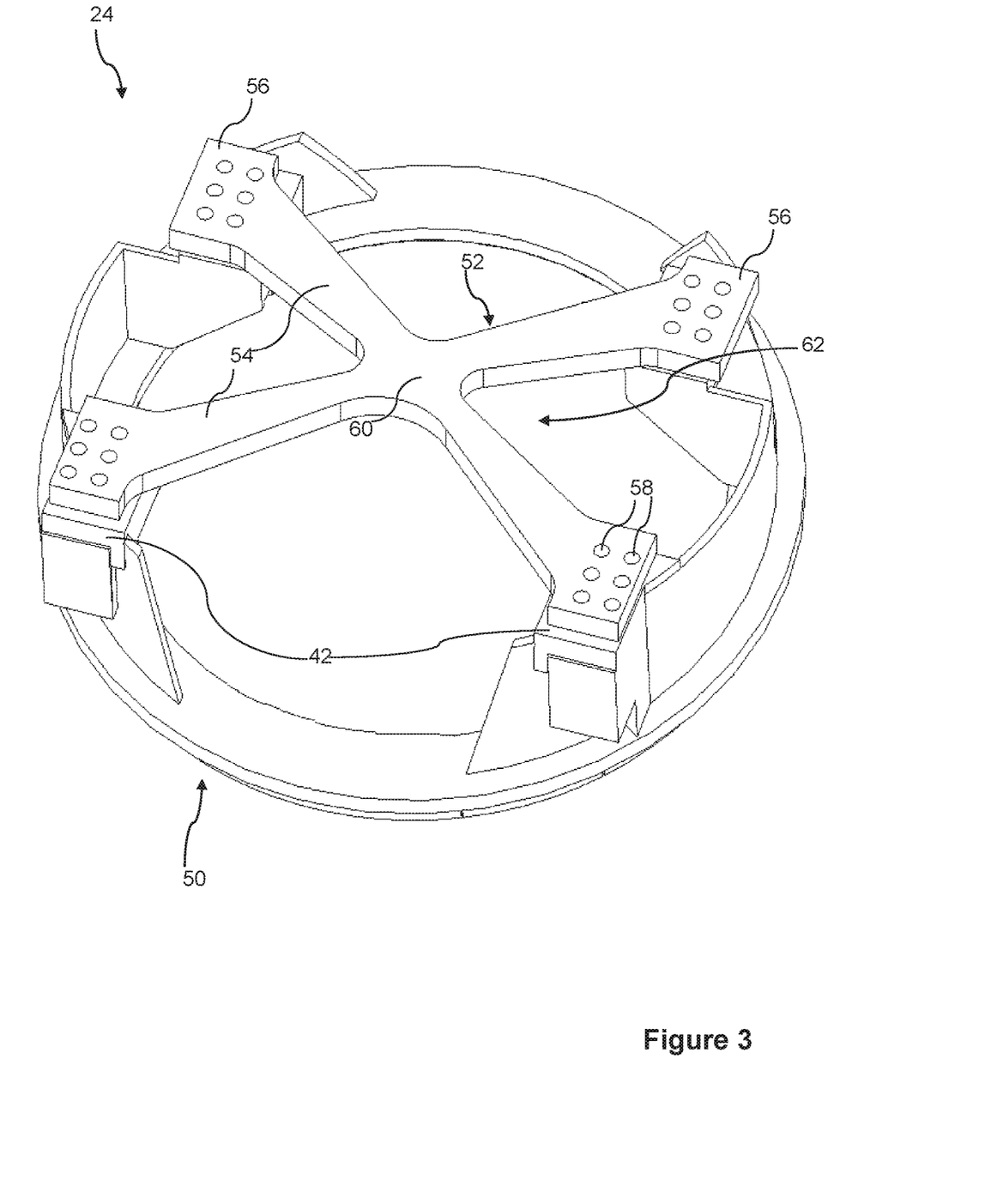
FIG. 3 is a schematic illustration of a supporting base frame assembly according to another embodiment of the present invention.

Whereas FIG. 2 shows the main shaft housing mounted on the base frame assembly of the present embodiment, FIG. 3 illustrates a base frame assembly in isolation so that its configuration can be shown more clearly.

In particular, it may be seen that the base frame assembly of the illustrated embodiment comprises a base frame 50 and a stiffening brace component 52. The constituent components 50, 52 of the base frame assembly 24 are produced separately and can be transported to an installation site or production site as individual components, where they are subsequently attached to one another during installation on the wind turbine tower.

It should be noted that the base frame assembly embodiment shown in FIG. 2 differs from that shown in FIG. 3 in some aspects, and additional details of these aspects will be described in more detail subsequently with reference to FIGS. 4a and 4b. The following description will focus on the brace component 52 and its interface with the main shaft housing 20 and the base frame 50.

The brace component 52 of the present embodiment comprises a cross brace with arm portions 54 that extend across the upper surface of the base frame 50, such that a connection between all of the mounting pads 42 is provided by the brace component 52. Each arm portion 54 terminates in a support plate 56 that is sized and configured so as to interface with and be secured to a complementary one of the mounting pads 42 on the base frame 50. Specifically, both the mounting pads 42 and support plates 56 of the illustrated embodiment are substantially rectangular, and the support plates 56 are intended to be placed on top of the respective mounting pads 42 when the base frame assembly components are secured together. In this embodiment, each support plate 56 is provided with a plurality of holes 58, each of which coincides with one of the group of holes that are provided in the respective mounting pad 42. Each support plate is fastened to its respective mounting pad 42 by bolts, or other equivalent types of fastenings, that pass through the holes.

The brace component 52 acts as a stiffener for the base frame 50, and ensures that the loads which are transferred from the main shaft housing 20 to the tower 2 via the base frame 50 are more evenly distributed across the base frame 50. The presence of the brace component 52 therefore serves to minimise local deformations to the base frame 50, as well as to the main shaft housing 20, whilst simplifying the manufacture of the base frame itself.

In the illustrated embodiment of FIG. 3, the brace component 52 is generally X-shaped, comprising four arm portions 54 that radiate from a central point or hub 60. Each of the arm portions 54 terminates in a respective support plate 56, which is sized and configured to be attached to a corresponding one of the mounting pads 42. The footprint or form factor of the brace component 52 therefore matches the footprint of the base frame mounting pads 42.

Although the illustrated embodiment comprises four mounting pads and four support plates, it will be appreciated that in some alternative embodiments, the base frame and the brace component may comprise different numbers or configurations of mounting pads and support plates respectively, and that such configurations will also fall within the scope of the present invention. For example, it is envisaged that there may be only two mounting pads provided on the base frame, and the brace component may comprise a single strut, extending between these support plates, and terminating at each end in a support plate.

Prior to installation, the base frame 50, brace component 52 and main shaft housing 20 are produced as separate components for transportation to the installation site or production site. During installation, the brace component 52 is mounted onto the base frame 50 to form the base frame assembly 24. The main shaft housing 20 is then mounted onto the base frame assembly 24 such that in use, the brace component 52 is effectively sandwiched between the base frame 50 and the main shaft housing 20. Specifically, the support plates 56 of the brace component 52 are mounted onto the respective mounting pads 42 of the base frame 50, and the respective support feet 32 of the main shaft housing 20 are mounted onto the respective support plates 56 of the brace component 52. In the illustrated embodiment, the fasteners that are used to secure the base frame 50 and the brace component 52 together are also used to fasten the main shaft housing 20 to the base frame assembly 24. This thereby allows the brace component 52 to be retrofit into an existing nacelle design, as the form factor or footprint of the brace component 52 matches that of the main shaft housing 20 and the base frame 50. The same bolts can therefore be used to secure all three pieces of equipment together. In other words, the same bolt that passes through a support foot 32 of the main shaft housing 20 is configured to pass all the way through a corresponding support plate 56 of the brace component 52, and into a corresponding mounting pad 42 of the base frame 50, thereby securing the entire assembly together.

It is noted that there are advantages associated with providing the brace component and the base frame as separate components, rather than incorporating the brace component into the base frame (such that the base frame assembly is produced as a single cast piece of equipment). In particular, the base frame 50 may be designed to be generally annular in horizontal cross-section, with a substantially open or empty central portion 62, such that the majority of the mass of the base frame 50 is provided around the periphery of the central portion 62. Such a base frame configuration is made possible as the majority of the loading from the main shaft housing and the nacelle is designed to act through the outer portions of the base frame 50 for increased stability. Maintaining a substantially open centre of the base frame ensures that no specific restrictions are imposed on the means by which the base frame assembly 24 is secured to the wind turbine tower 2. In particular, any other components (e.g. wires or other supporting components) that may need to pass from the nacelle 4 into the wind turbine tower 2 may easily pass through the centre of the base frame.

Although the illustrated embodiment of the brace component in FIG. 3 is shown as a substantially flat plate with a relatively small vertical thickness or height (compared to the height of the base frame), it is envisaged that the thickness or height of the brace component, as well as its cross-sectional profile may be varied or selected to achieve certain strength characteristics. For example, the cross sectional profile of the brace component (in particular of the support plates and the arm portions) may be a solid square, or tubular, or even shaped like an I-beam, depending on the buckling stiffness that is required.

As mentioned previously, this base frame assembly design allows the brace component 52 to be sandwiched between the base frame 50 and the main shaft housing 20, such that the brace component acts as a spacer between the base frame and main shaft housing. This means that retrofitting the brace component into an existing nacelle design is very simple and requires very little modification, as the footprint of the brace component 52 is a match for the footprints of the main shaft housing 20 and the base frame 50. The only requirement during installation is the use of long bolts that are designed to extend through a support foot 32 of the main shaft housing 20, pass through the respective support plate 56 of the brace component 52 and extend into the respective mounting pad 42 of the base frame 50. This thereby simplifies the manufacture and installation of the base frame assembly 24.

Furthermore, an additional advantage associated with having a base frame assembly that is separable into a main load-bearing base frame 50 and a secondary supporting and stiffening brace component 52 is the flexibility of the overall assembly. Specifically, the base frame assembly 24 incorporating the brace component 52 may be utilised as illustrated in larger turbines that require added support. However, in the case of smaller turbines that do not require the additional support, the brace component 52 may be removed but the same base frame 50 may still be utilised.

Figure 4A:
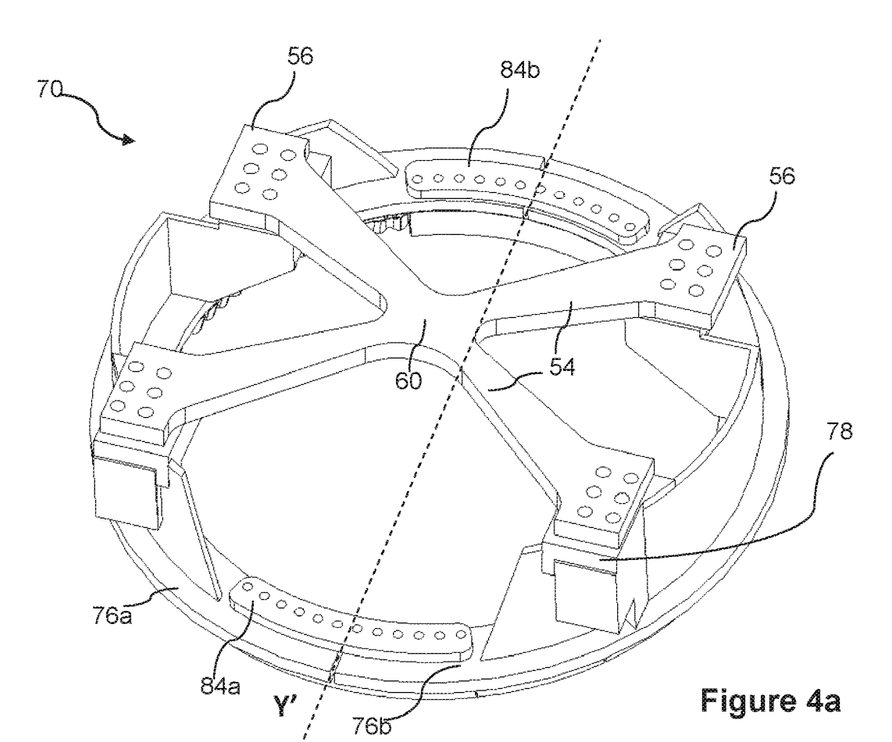
FIGS. 4a and 4b are schematic illustrations of the base frame assembly according to the embodiment of the present invention shown in FIG. 2.
Figure 4B:
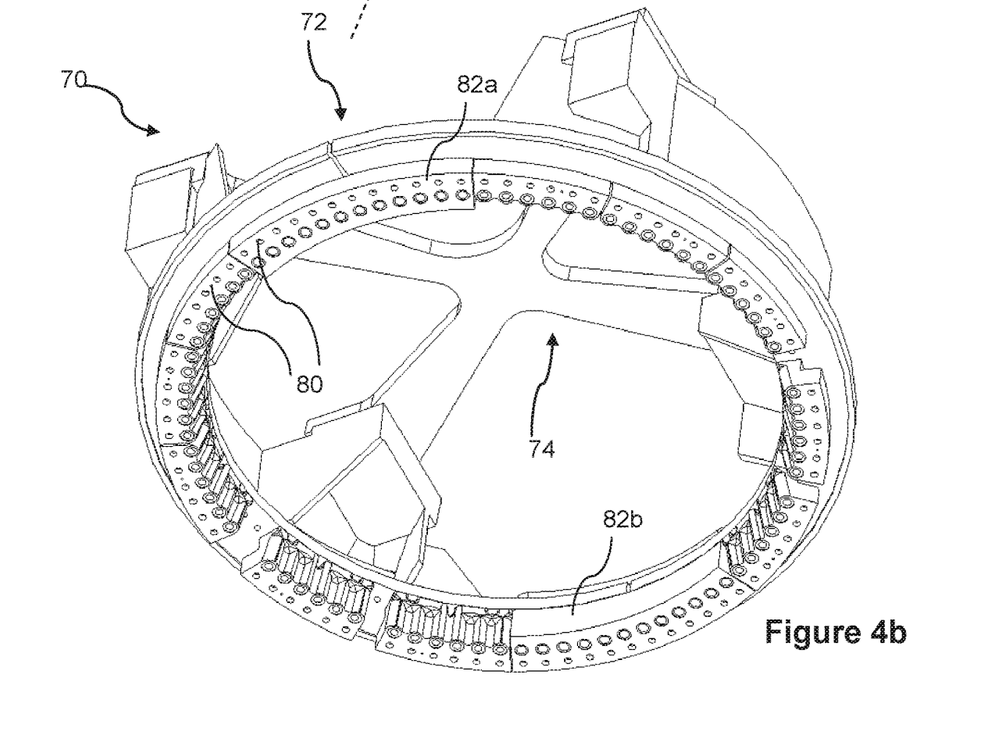

FIGS. 4a and 4b illustrate a base frame assembly, for implementation in a wind turbine, according to another embodiment of the present invention. Whereas FIG. 3 shows the base frame assembly mounted on other components of the turbine tower, the base frame assembly of FIGS. 4a and 4b is shown in isolation (and from both above and below) so that's its configuration can be shown more clearly.

The base frame assembly 70 of this embodiment is similar to that in the embodiment of FIG. 3, as it also comprises two main separable components—a load-bearing base frame 72 which interfaces with the other components in the wind turbine tower 2 such as the yaw system 6, and a stiffening brace component 74 arranged on an upper surface of the base frame 72 so as to be sandwiched between the base frame 72 and supporting legs extending from the main shaft housing 20 (both components not shown in this figure). To avoid unnecessary repetition, the following description will now focus on the differences between the embodiment of FIG. 3, and that of FIGS. 4a and 4b.

In the illustrated embodiment of FIGS. 4a and 4b, the base frame itself comprises two separable sub-components 76a, 76b that are produced separately and subsequently secured together at an installation site where the base frame assembly 70 is to be mounted onto the turbine tower 2. The sub-components 76a, 76b of the base frame 72 may be secured to one another by any conventional means, such as welding, or through the use of bolts or other forms of fasteners. A more portable base frame assembly is thereby achieved by utilising this design, as each sub-component is smaller and lighter, and therefore easier to produce and transport, than if the base frame were produced as a single unit.

In the embodiment of FIGS. 4a and 4b, the base frame 72 comprises a first base frame half-portion 76a and a second base frame half-portion 76b that are produced separately and subsequently joined together to produce a whole base frame, which is substantially the same as the single-piece base frame 50 in the embodiment of FIG. 3. In the illustrated embodiment, the two base frame half-portions 76a, 76b are effectively mirror images of one another about axis Y', provided the nacelle 4 and the interface of the base frame 72 with the turbine tower 2 are generally substantially symmetrical about the axis Y', although this is not essential.

Each base frame half-portion 76a, 76b comprises two mounting pads 78 for receiving the support feet 32 of the main shaft housing 20 (in a similar manner to that shown in FIG. 2), ensuring that the forces exerted by the main shaft housing 20 on the base frame assembly 70 as a whole are evenly-distributed between the two half-portions.

In use, when the base frame half-portions 76a, 76b are joined together, the footprint produced by the mounting pads of the resultant base frame 72 is substantially the same as that of the single-piece base frame 50 of FIG. 3. The same brace component can therefore be used with both embodiments of the base frame illustrated herein.

The base frame is attached on its underside to the main turbine tower 2 via the yaw system 6, and particularly by a plurality of yaw bars 80, which may be seen in FIG. 4b. These yaw bars 80 couple the base frame 72 to the yaw drive (not shown), allowing the base frame 72 and the attached nacelle 4 to be controlled and rotated into the wind direction by the yaw drive motors (not shown). When the base frame half-portions 76a, 76b are mounted on the turbine tower 2, the yaw system is arranged and configured such that a single yaw bar 82a, 82b bridges or spans the underside of a joint or interface between the two base frame half-portions 76a, 76b, thereby strengthening these joints. In some embodiments, strengthening bars 84a, 84b are also mounted on the base frame 72, each strengthening bar 84a, 84b, spanning an upper surface of a respective joint between the two base frame half-portions 76a, 76b to provide additional support and strength to the joint. The combination of the yaw bars 82a, 82b and the strengthening bars 84a, 84b bridging each joint between the two half-portions prevents them from breaking, cracking or otherwise separating from one another following extreme strain and wear and tear resulting from prolonged use.

As mentioned previously, the brace component 74 of this illustrated embodiment is substantially the same as that of the previous embodiment, and is arranged and secured to the base frame 74 in a similar manner to that shown in FIG. 3. Specifically, the brace component 74 is generally X-shaped, comprising four arm portions 54 that radiate from a central point 60. Each arm portion 54 terminates in a respective support plate 56 that interfaces with a corresponding mounting pad 78. As with the embodiment of FIG. 3, the support plates 56 of the brace component 74 have the same footprint or form factor as the mounting pads 78 of the base frame 72. Each support plate 56 is therefore secured to the respective mounting pad 78 and respective support foot 32 of the main shaft housing via long bolts or other types of fastener, as previously described. In the embodiment of FIGS. 4a and 4b, the structure and arrangement of the brace component also advantageously provides an additional connection between the two base frame half-portions, thereby strengthening and supporting the joint between them.

It will be appreciated that although the base frame 72 of the illustrated embodiment comprises two base frame half-portions 76a, 76b that may be joined together along a longitudinal axis Y', which is parallel to the axis of rotation Y of the main rotor shaft, other embodiments are envisaged in which the base frame is produced by joining two components along other axes. Additionally or alternatively, the base frame may be designed so as to comprise more than two separable components. For example, it would be possible for the base frame to be produced by joining three base frame third-portions, or four base frame quarter-portions. In still other embodiments, the base frame may be produced by joining portions that are of different sizes.

Many modifications may be made to the above examples without departing from the scope of the present invention as defined in the accompanying claims.

The invention claimed is:

1. A base frame assembly for supporting a main shaft housing of a wind turbine, the main shaft housing including a plurality of support feet, the base frame assembly comprising:
   a base frame having a plurality of mounting pads for receiving the main shaft housing thereon; and
   a brace component comprising a plurality of arm portions, each arm portion terminating in a respective support plate;
   wherein each one of the mounting pads of the base frame is configured to interface with and be secured to a corresponding one of the support plates of the brace component, and
   wherein each one of the support plates of the brace component is configured to interface with and be secured to a corresponding one of the plurality of support feet of the main shaft housing.

2. The base frame assembly of claim 1 wherein, when the main shaft housing is received onto the base frame, each support plate of the brace component is sandwiched between and secured to a respective support foot of the main shaft housing and the respective mounting pad of the base frame.

3. The base frame assembly of claim 1, wherein each support plate and respective mounting pad are secured using a common group of one or more fasteners.

4. The base frame assembly of claim 1, wherein the base frame is generally annular in horizontal cross-section and provides a substantially open central portion.

5. The base frame assembly of claim 1, wherein the brace component is generally X-shaped.

6. The base frame assembly of claim 1, wherein the base frame comprises a plurality of separable sub-components.

7. The base frame assembly of claim 6, wherein the base frame comprises first and second base frame half-portions.

8. The base frame assembly of claim 7, wherein an underside of the base frame carries a plurality of yaw bar components, and wherein one of the yaw bar components spans a joint between the first and second base frame half-portions.

9. The base frame assembly of claim 6, wherein a strengthening bar is provided across an upper surface of a joint between the base frame sub-components.

10. The base frame assembly of claim 1, wherein the brace component has at least one of the following: a greater dimension in a vertical plane than in a horizontal plane, and a tubular cross-section.

11. A nacelle of a wind turbine comprising the base frame assembly according to claim 1.

12. A base frame assembly for supporting a main shaft housing of a wind turbine, the base frame assembly comprising:
   a base frame having a plurality of mounting pads for receiving the main shaft housing thereon, wherein the base frame comprises at least first and second frame portions, and wherein an underside of the base frame carries a plurality of yaw bar components, wherein the plurality of yaw bar components couple the base frame assembly to a yaw system, wherein one of the yaw bar components spans a joint between the first and second frame portions and couples the first frame portion to the second frame portion, and wherein the plurality of yaw bar components include gear teeth for interfacing with the yaw system.

13. The base frame assembly of claim 12, further comprising a brace component wherein:
- the brace component comprises a plurality of arm portions, each arm portion terminating in a respective support plate; and
- each one of the mounting pads of the base frame is configured to interface with and be secured to a corresponding one of the support plates of the brace component.

14. The base frame assembly of claim 12, wherein the plurality of yaw bar components are attached to the base frame.

15. The base frame assembly of claim 12, wherein the one of the yaw bar components strengthens the joint between the first and second frame portions.

16. A base frame assembly for supporting a main shaft housing of a wind turbine, the base frame assembly comprising:
- a base frame having a plurality of mounting pads for receiving the main shaft housing thereon, wherein the base frame comprises at least first and second frame portions, and wherein an underside of the base frame carries a plurality of yaw bar components, wherein the plurality of yaw bar components couple the base frame assembly to a yaw system, wherein one of the yaw bar components spans a joint between the first and second frame portions and couples the first frame portion to the second frame portion, and wherein the first and second frame portions are coupled together by at least one strengthening bar, the at least one strengthening bar provided across an upper surface of the joint between the first and second frame portions.

17. The base frame assembly of claim 16, wherein the plurality of yaw bar components include gear teeth for interfacing with the yaw system.

18. The base frame assembly of claim 16, further comprising a brace component wherein:
- the brace component comprises a plurality of arm portions, each arm portion terminating in a respective support plate; and
- each one of the mounting pads of the base frame is configured to interface with and be secured to a corresponding one of the support plates of the brace component.

19. The base frame assembly of claim 16, wherein the plurality of yaw bar components are attached to the base frame.

20. The base frame assembly of claim 16, wherein the one of the yaw bar components strengthens the joint between the first and second frame portions.

* * * * *